(12) United States Patent
Yoon et al.

(10) Patent No.: US 6,173,407 B1
(45) Date of Patent: Jan. 9, 2001

(54) METHOD OF AUTHENTICATING AND CHARGING A CLIENT USING A WEB INFOSHOP SERVICE SYSTEM

(75) Inventors: Chang Woo Yoon; Young Hoon Kim; Dae Ung Kim, all of Daejeon (KR)

(73) Assignees: Electronics and Telecommunications Research Institute, Daejeon; Korea Telecom, Seoul, both of (KR)

( * ) Notice: Under 35 U.S.C. 154(b), the term of this patent shall be extended for 0 days.

(21) Appl. No.: 09/132,616

(22) Filed: Aug. 11, 1998

(30) Foreign Application Priority Data

Nov. 13, 1997 (KR) .................................................. 97-59847

(51) Int. Cl.[7] .......................................................... G06F 11/00
(52) U.S. Cl. ............................................................... 713/201
(58) Field of Search .................................... 713/201, 200, 713/202; 370/352, 356, 221; 380/23, 24, 25, 29, 30

(56) References Cited

U.S. PATENT DOCUMENTS

| | | | |
|---|---|---|---|
| 5,218,637 | | 6/1993 | Angebaud et al. ..................... 380/23 |
| 5,220,603 | | 6/1993 | Parker .................................... 380/21 |
| 5,235,642 | | 8/1993 | Wobber et al. ........................ 380/25 |
| 5,586,260 | | 12/1996 | Hu ..................................... 395/200.2 |
| 5,717,923 | * | 2/1998 | Dedrick ................................ 395/613 |
| 5,729,594 | * | 3/1998 | Klingman ........................... 379/93.12 |
| 5,757,924 | * | 5/1998 | Friedman et al. ..................... 380/49 |
| 5,784,464 | * | 7/1998 | Akiyama et al. ...................... 380/25 |
| 5,790,677 | * | 8/1998 | Fox et al. .............................. 380/24 |
| 5,815,665 | * | 9/1998 | Teper et al. ..................... 395/200.59 |
| 5,825,877 | * | 10/1998 | Dan et al. ................................ 380/4 |
| 5,826,241 | * | 10/1998 | Stein et al. ............................. 705/26 |
| 5,889,958 | * | 3/1999 | Willens .......................... 395/200.59 |
| 5,918,019 | * | 6/1999 | Valencia ......................... 395/200.57 |
| 5,956,697 | * | 9/1999 | Usui ...................................... 705/32 |
| 6,097,719 | * | 10/1998 | Benash et al. ....................... 370/352 |

OTHER PUBLICATIONS

Shuichi et al., Information providing system, JPAB, Pub. #JP02000092236 A, 1 of 1, Mar. 2000.*
Masuda, Ryuta, Authentication seperation type communication system and method therefor, JPAB, Pub. #JP2000032171 A, 1 of 1, Jan. 2000.*
Usui, Tatsuo, Time limited use charging system for internet, JPAB, Pub. #JP410027036A, 1 of 1, Jan. 1998.*
Amir Herzberg et al. "Mini–Pay: C$_h$arging per Click on the Web", http://www6.nttlabs.com/HyperNews/get/PAPER, 15 pages.
Marcus J. Ranum et al., "Strategic Security", Data Communications, Oct. 1996, pp. 86–94.
Marvin Sirbu et al., "NetBill: An Internet Commerce System Optimized for Network Delivered Services", 1995 IEEE, pp. 20–25.
Stefan Brands, "Electronic Cash on the Internet", 1995 IEEE, pp.64–84.
S. Cobb, "Security Issues in Internet Commerce", IEEE, pp. 186–191.

* cited by examiner

Primary Examiner—Nadeem Iqbal
(74) Attorney, Agent, or Firm—Jacobson, Price, Holman & Stern, PLLC

(57) ABSTRACT

A method of authenticating and charging a client using a web infoshop service system comprising the steps of: transmitting protocol address information from the service system to the client when the client accesses the service system and selects a protocol access; when a user request to the service system is for a charged content provider, adding an authentication value to the user request, transmitting the user request including the authentication value from the service system to the charged content provider, and transmitting information corresponding to the user request from the content provider to the client; and when the client cancels the protocol access and notifies cancellation information to the service system, transmitting charging information using the service system.

4 Claims, 9 Drawing Sheets

METHOD OF AUTHENTICATING AND CHARGING A CLIENT USING A WEB INFOSHOP SERVICE SYSTEM

BACKGROUND OF THE INVENTION

1. Field of the Invention

The present invention relates to a method of authenticating and charging a client using a web infoshop service system, wherein the web infoshop service system authenticates and charges a client in place of a content provider when the client uses a charged information service of the content provider.

2. Description of the Prior Art

FIG. 1 illustrates a configuration of a content providing service network in a conventional system. A client computer 101 connects to a charged content provider 105 through a public switched telephone network 102 and a telephone matching equipment 103. The telephone matching equipment 103 has only a function of converting a telephone network protocol into an internet protocol and has been disclosed in a paper appearing in a collection of papers of a fall general scientific meeting held by Korea Communication Academy on November in 1996 for Design of Open Internet Connection Sub-System and Implementation Thereof.

The client computer 104 is connected to the charged content provider 105 through the internet 106. In such content providing service network of the conventional system, management and responsibility for the authentication is in the client computers 101 and 104 and the charged content provider 105, and management for charging is directly processed by the content provider 105. There is no problem in this conventional system if the number of the charged content providers is small, but the charged content providers are in tend of increase. A basic authentication method provided by a hypertext transfer protocol is a representative authentication method generally used in present, and new methods enhancing security function have been developed and applied.

In the conventional system, since the charged content provider 105 takes charge of the authentication and charging with respect to a web information providing service, clients or users must obtain separate authentication values for different content providers to use the contents provided different charged content providers 105.

Additionally, when a client uses a charged content provider 105, the client must enter a unique authentication value (a user identification and a password) determined by the client and the charged content provider 105. The client must maintain and manage different authentication types and their values to use the information of the different charged content providers, while the charged content provider 105 must separately manage authentication values for different clients and conduct tasks such as calculation of an amount of charge for each client from the amount used, issue of bills, and receipt of charges. Therefore, there is a problem in that the charged content providers are annoyed to perform the management of the authentication and charging besides provision of information which is a basic task of the content provider.

SUMMARY OF THE INVENTION

Accordingly, the present invention is directed to a method of authenticating and charging a client using a web infoshop service system that substantially obviates one or more of the problems due to limitations and disadvantages of the related art.

An objective of the present invention is to provide a method of authenticating and charging a client using a web infoshop service system where the web infoshop service system, in place of a charged content provider, authenticates a client and performs charging tasks, such as calculation of an amount of charge, issue of bills, and receipt of charges, with respect to each directory as well as each internet address, the charging being performed by the time as well as volume of data.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a method of authenticating and charging a client using a web infoshop service system includes the steps of: transmitting protocol address information from the service system to the client when the client accesses the service system and selects a protocol access; when a user request to the service system is for a charged content provider, adding an authentication value to the user request, transmitting the user request including the authentication value from the service system to the charged content provider, and transmitting information corresponding to the user request from the content provider to the client; and when the client cancels the protocol access and notifies cancellation information to the service system, transmitting charging information using the service system.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the drawings:

DETAILED DESCRIPTION OF PREFERRED EMBODIMENT

Reference will now be made in detail to the preferred embodiments of the present invention, examples of which are illustrated in the accompanying drawings.

With reference to the accompanying drawings, a preferred embodiment of the present invention will now be described in detail.

A web infoshop service indicates that an infoshop service provided through a telephone network is provided in the format conforming to a world wide web. The web infoshop service comprises a client (or a user), a web infoshop service system, and a charged content provider. The client pays for use of information to the content provider through the web infoshop service system.

Figure 1:
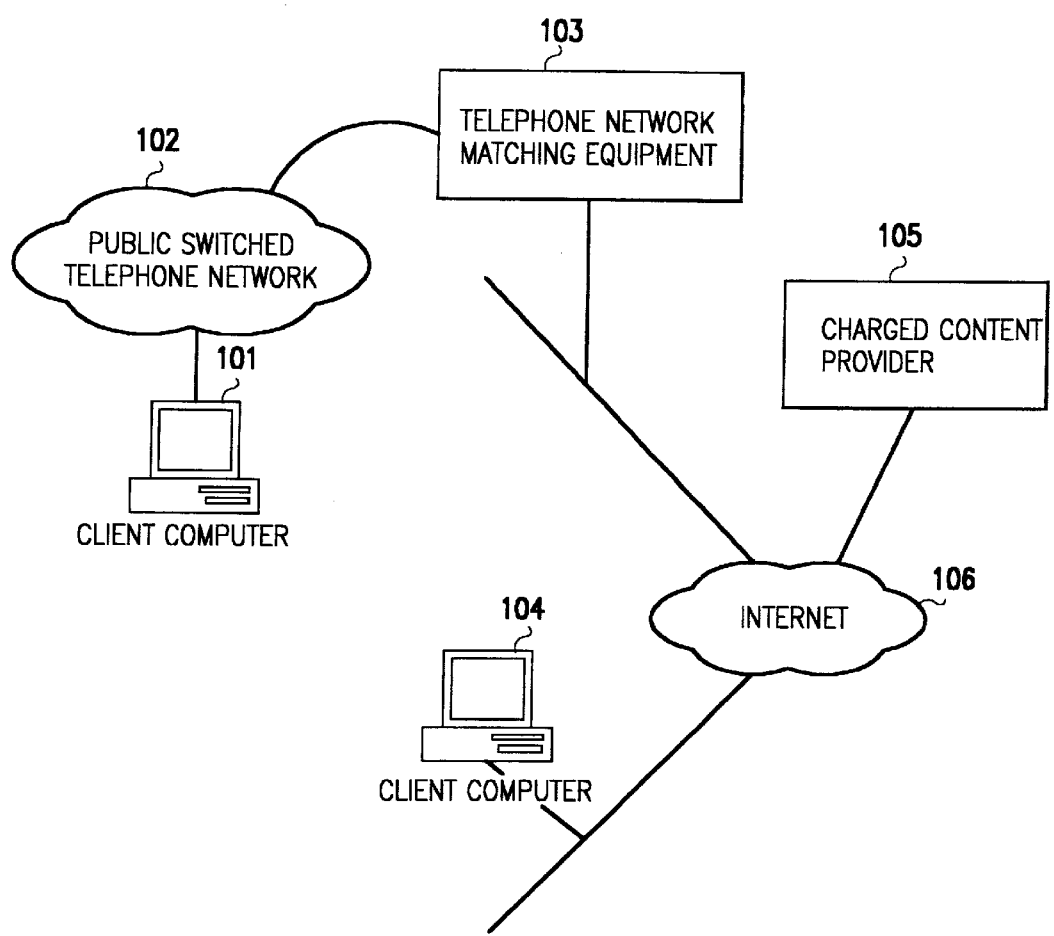
FIG. 1 shows a configuration of an information providing service network in a conventional system.
Figure 2:
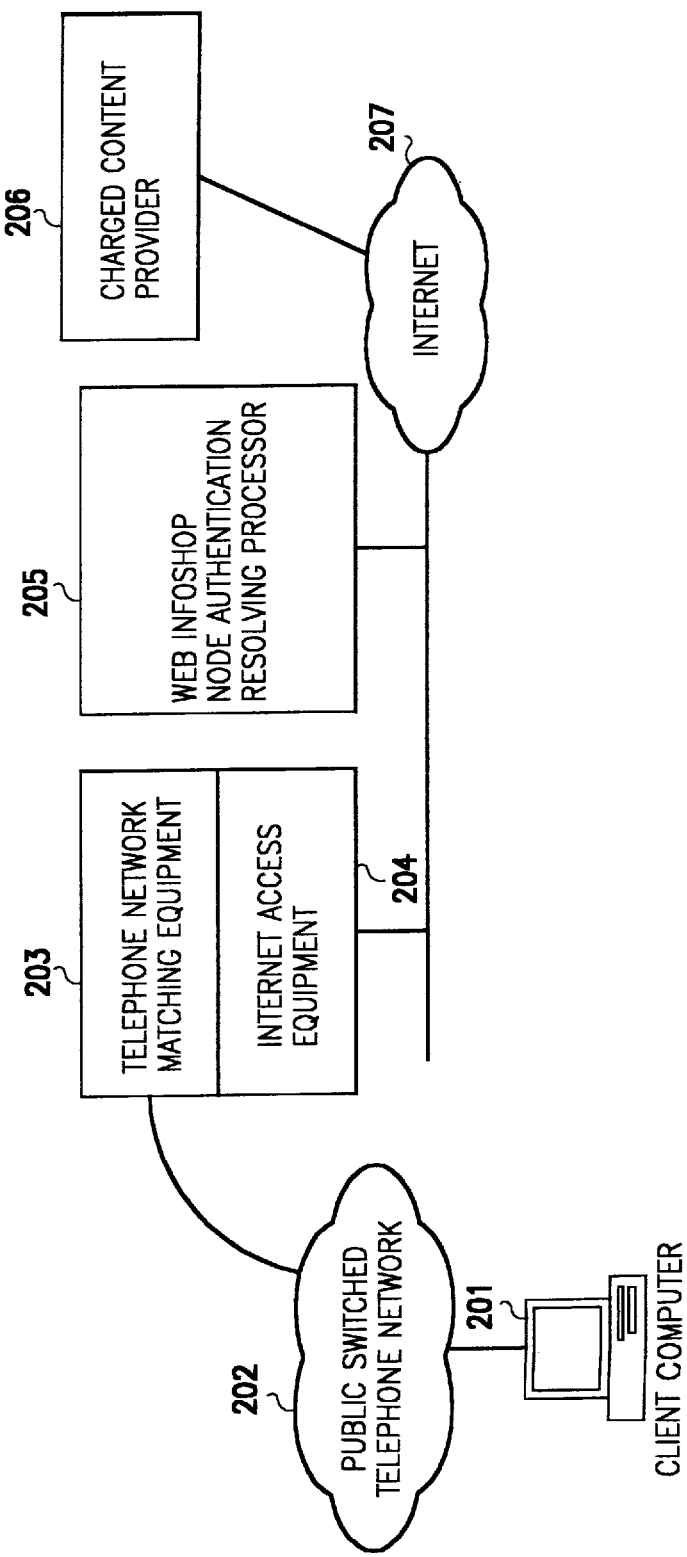
FIG. 2 shows a configuration of a web infoshop service system network to which the present invention is applied.

As shown in FIG. 2, the network of the web infoshop service system includes a telephone network matching equipment 203, an internet access equipment 204, and a web infoshop node authentication resolving processor 205.

The telephone network matching equipment 203 performs transmission and reception of modem data when the client computer 201 connects to a public switched telephone network 202 using its modem.

The internet access equipment 204 converts the client data passing through the modem into a format conforming to the internet to allow the client computer 201 to be connected to and use the internet. The internet access equipment includes a serial line internet protocol/point to point protocol for serial line connection and a transmission control protocol/internet protocol for the connection to the internet and performs account management, thereby allowing the client computer 201 to be furnished with internet services through the modem.

The web infoshop node authentication resolving processor 205 processes all traffics when the client computer 201 runs a program using the hypertext transfer protocol. To make the traffics of internet clients pass through the web infoshop node authentication resolving processor 205 for the web infoshop service, an address of the web infoshop node authentication resolving processor 205 must be set as a corresponding value of a proxy server of each client on a web browser. The charged content provider 206 indicates an enterpriser which provides information to internet clients through connection to the internet 207 and charges the clients fees for use the information. On behalf of these charged content providers 206, the web infoshop node authentication resolving processor 205 processes the charging.

Figure 3:
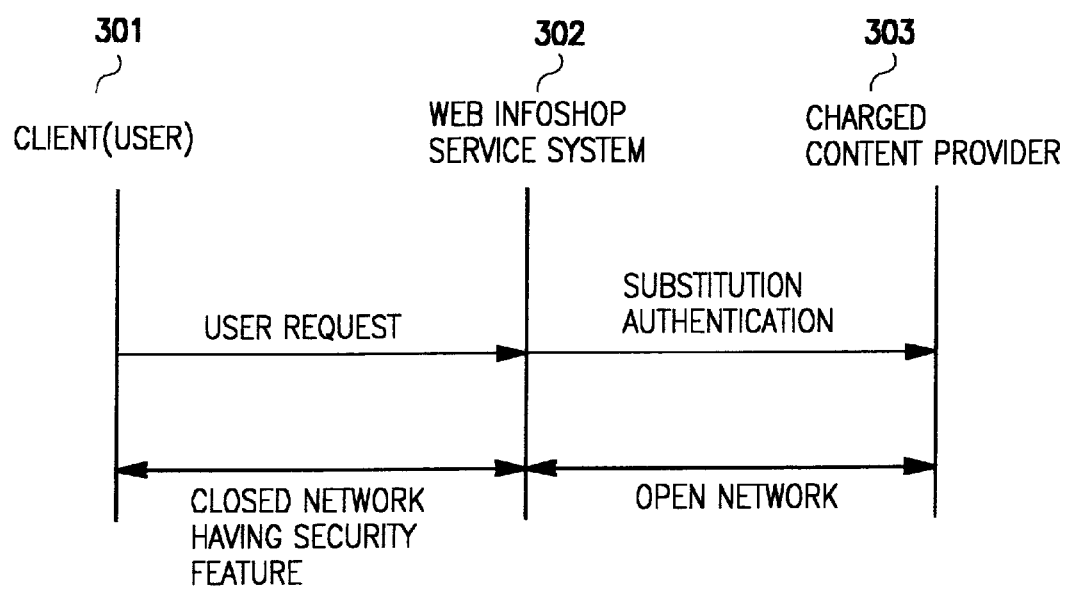
FIG. 3 is a conceptual diagram of the substitution authentication by a web infoshop service system according to the present invention.

As shown in FIG. 3, a client 301 using the public switched telephone network is connected to a web infoshop service system 302 and the web infoshop service system 302 is connected to a charged content provider 303.

If the web infoshop service system 302 does not exist, the client 301 is directly connected to the charged content provider 303 and passes through necessary authentication procedure to use the content of the provider. In this case, various authentication methods may be utilized, but commonly a user name and a password are used for the authentication. Accordingly, if the client 301 uses many different content providers 303, the client 301 should maintain and manage different authentication procedures and values corresponding different content providers 303.

On the other hand, when using the authentication method of the present invention, the client 301 is not directly connected to the charged content provider 303, instead, it is connected via the web infoshop service system 302 to the content provider 303.

The client 301 only has to maintain a single authentication to the web infoshop service system 302, and the web infoshop service system 302 maintains and manages authentications for each charged content provider 303 and passes through the authentication procedure on behalf of the client 301. In other words, once the client 301 sends a client request 304 for the charged content provider 303 to the web infoshop service system 302, the web infoshop service system 302 authenticates the client for the corresponding content provider 303 using an authentication method and value corresponding to the relevant content provider 303.

Due to the above substitution authentication method, the client 301 has benefit of just maintaining a single authentication to the web infoshop service system 302. The web infoshop service system 302 suggested in the present invention can be used just through a telephone of the client without necessary of a special authentication value. To support such authentication method described above, the network connecting the client 301 to the web infoshop service system 302 should be a closed network equipped with a security feature.

The public switched telephone network satisfying the condition necessary for the closed network is employed for the network between the client 301 and the web infoshop service system 302 in the present invention. A protocol used for transmission of data on the public switched telephone network is a point-to-point protocol having the security feature. Users or clients are discriminated through telephone numbers, and fees are charged by these telephone numbers.

Figure 4:
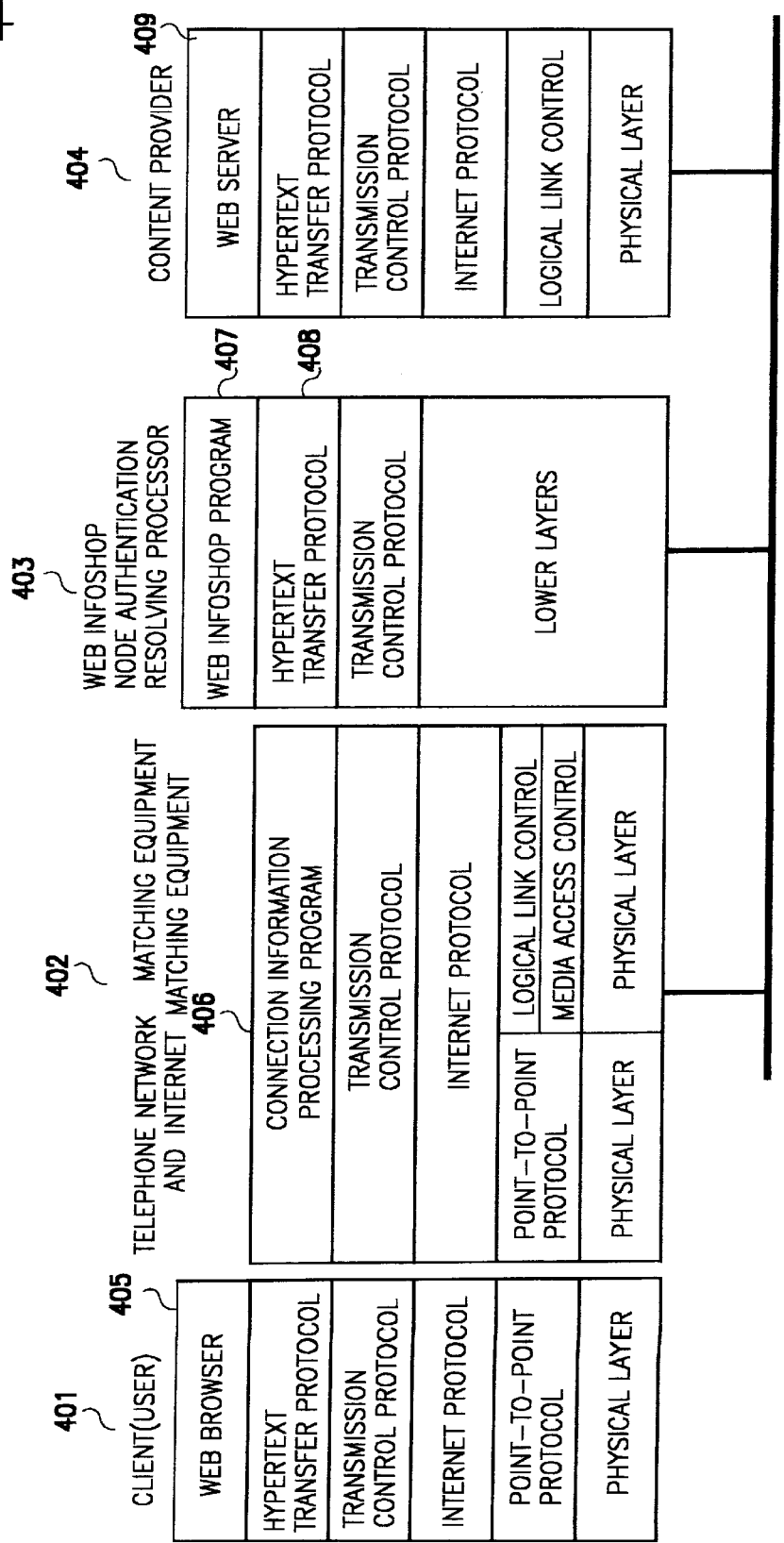
FIG. 4 is an architecture of a protocol of the web infoshop service system depicted in FIG. 2.

FIG. 4 shows an architecture of the protocol of the web infoshop service system depicted in FIG. 2.

A client 401 uses the internet web services through a web browser 405. Data transmission between the client 401 and a telephone network and internet matching equipment 402 is performed through modem connection using the public switched telephone network and the point-to-point protocol. The telephone network and internet matching equipment 402 includes a connection information processing program 406.

Once the point-to-point protocol is connected, the connection information processing program 406 located within the telephone network and internet matching equipment 402 registers point-to-point protocol information to initialize a use recording file. If the point-to-point protocol is disconnected, the connection information processing program 406 removes the point-to-point protocol information and creates a charging file.

The data transmitted from the client 401 through the public switched telephone network is converted into an internet protocol at the telephone network and internet matching equipment 402 and then forwarded to the internet. The user data converted into the internet protocol is processed by a web infoshop program 407 for processing the substitution authentication and charging at a web infoshop service system 403 and then sent to a charged content provider 404. A web server 409 of the content provider 404 searches out information wanted by the user and sends it to the web infoshop service system 403. The web infoshop service system sends the information to the client 401.

Figure 5:
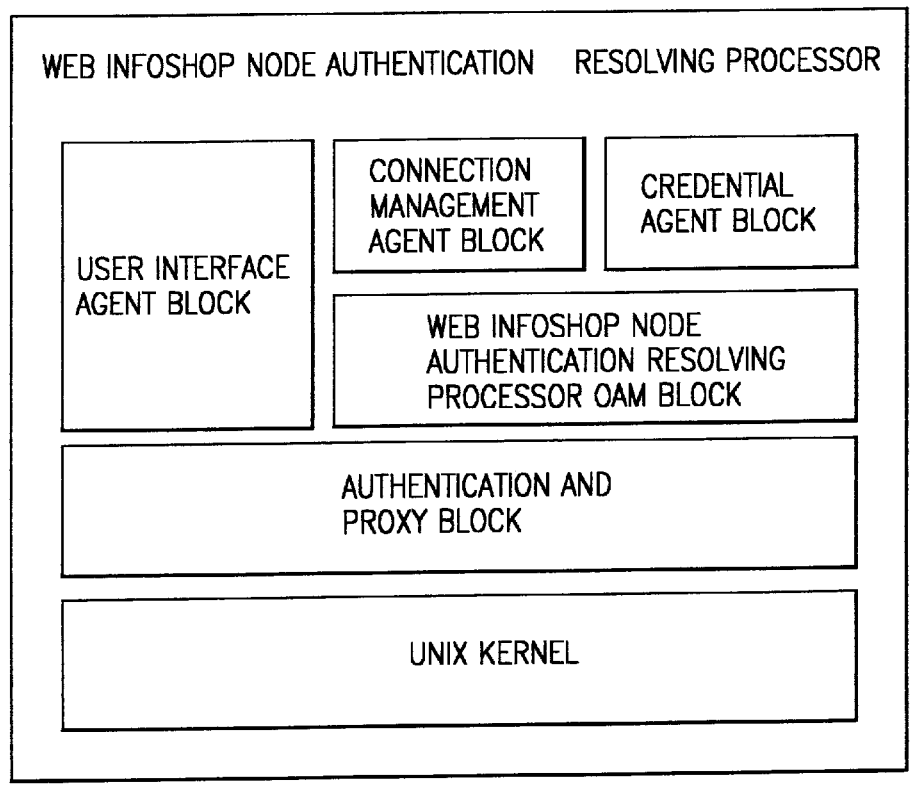
FIG. 5 is a block diagram of an embodiment of the web infoshop node authentication resolving processor depicted in FIG. 2.

FIG. 5 is a block diagram of one embodiment of the web infoshop node authentication resolving processor depicted in FIG. 2.

The web infoshop node authentication resolving processor indicates a whole block providing the web infoshop service.

An authentication and proxy block takes charge of authentication and proxy functions. This block processes the request of the authentication of the client for the content provider and provides a basic web service.

A connection management agent block manages user connection information and the statuses that services are used by users.

A credential agent block checks whether the request of the client is for the charged content provider and creates an authentication value for the charged content provider.

A user interface agent block displays information about the charged content provider for the user and receives an answer entered by the user.

A web infoshop node authentication resolving processor OAM (Operations, Administration, and Maintenance) block manages a content provider table and creates charging information for the user.

Figure 6:
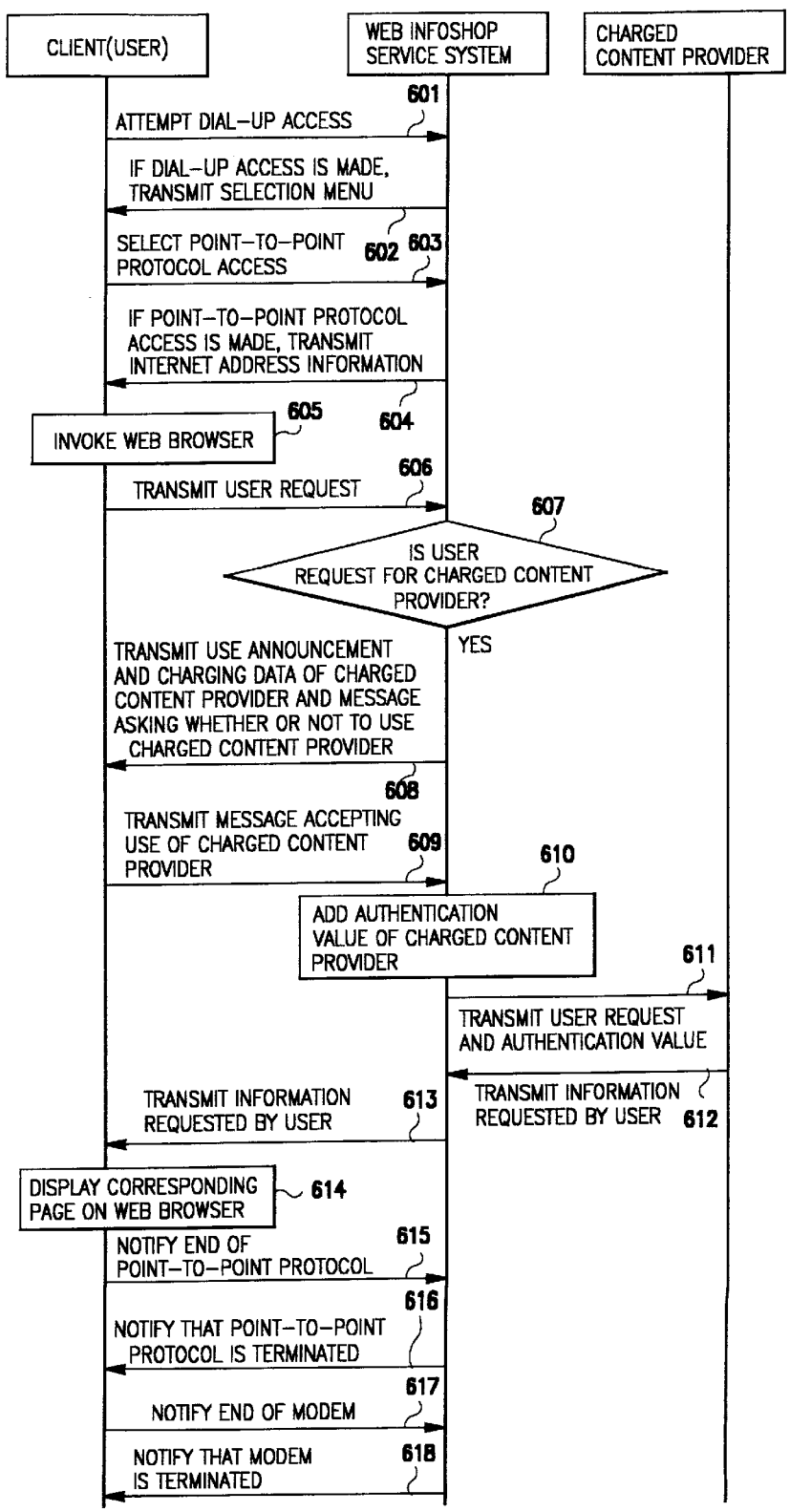
FIG. 6 is a flow chart showing the process of a substitution authentication and charging method performed through a web infoshop service according to the present invention.

As shown in FIG. 6, the client attempts access using a web infoshop service system access telephone number (601). If the access is made, the web infoshop service system sends a selection menu to the client (602), and the client selects a point-to-point protocol access from the selection menu (603).

If the point-to-point protocol access is completed, information about an internet protocol address assigned to the client is sent to the client (604) and the user can use the internet services.

Subsequently, the user invokes a web browser to use the web infoshop service (605). At this time, a proxy option of the web browser should be set to the internet protocol address of the web infoshop service system. If a user request is sent to the web infoshop service system through the web browser (606), the web infoshop service system determines whether the user request is for the charged content provider (607). If the request is determined to be for the charged content provider, the infoshop service system sends to the client, charged content provider information which includes an official announcement and charging data of the charged content provider with a message asking whether or not to use the content provider (608).

When the client sends a message that it will use the relevant charged content provider to the web infoshop service system, that is, when the user requests the use of the relevant charged content provider (609), the web infoshop service system adds an authentication value for the relevant charged content provider to a user request (610) and sends the user request including the authentication value to the charged content provider (611).

The charged content provider sends the content of information requested by the user to the web infoshop service system (612). The web infoshop service system sends the content of a relevant page to the client (613), and the relevant information page is displayed on the web browser of the client (614).

When the client sends an end message notifying the termination of the point-to-point protocol connection to the web infoshop service system (615), the web infoshop service system notifies the end of the point-to-point protocol connection to the client (616). When the client notifies the end of the modem to the web infoshop service system (617), the web infoshop service system notifies to the client that the end of the modem is completed (618).

As illustrated, the substitution authentication method of the present invention is a forward substitution authentication method which primarily analyzes the request of the user and preferentially processes the authentication for the charged content provider requiring an authentication value. In a reverse substitution authentication method, the user request is sent to the charged content provider without modification and an authentication value is requested, thus giving the authentication value. The reverse substitution authentication method has an inconvenience in that the connection to the charged content provider must be established two times.

Figure 7A:
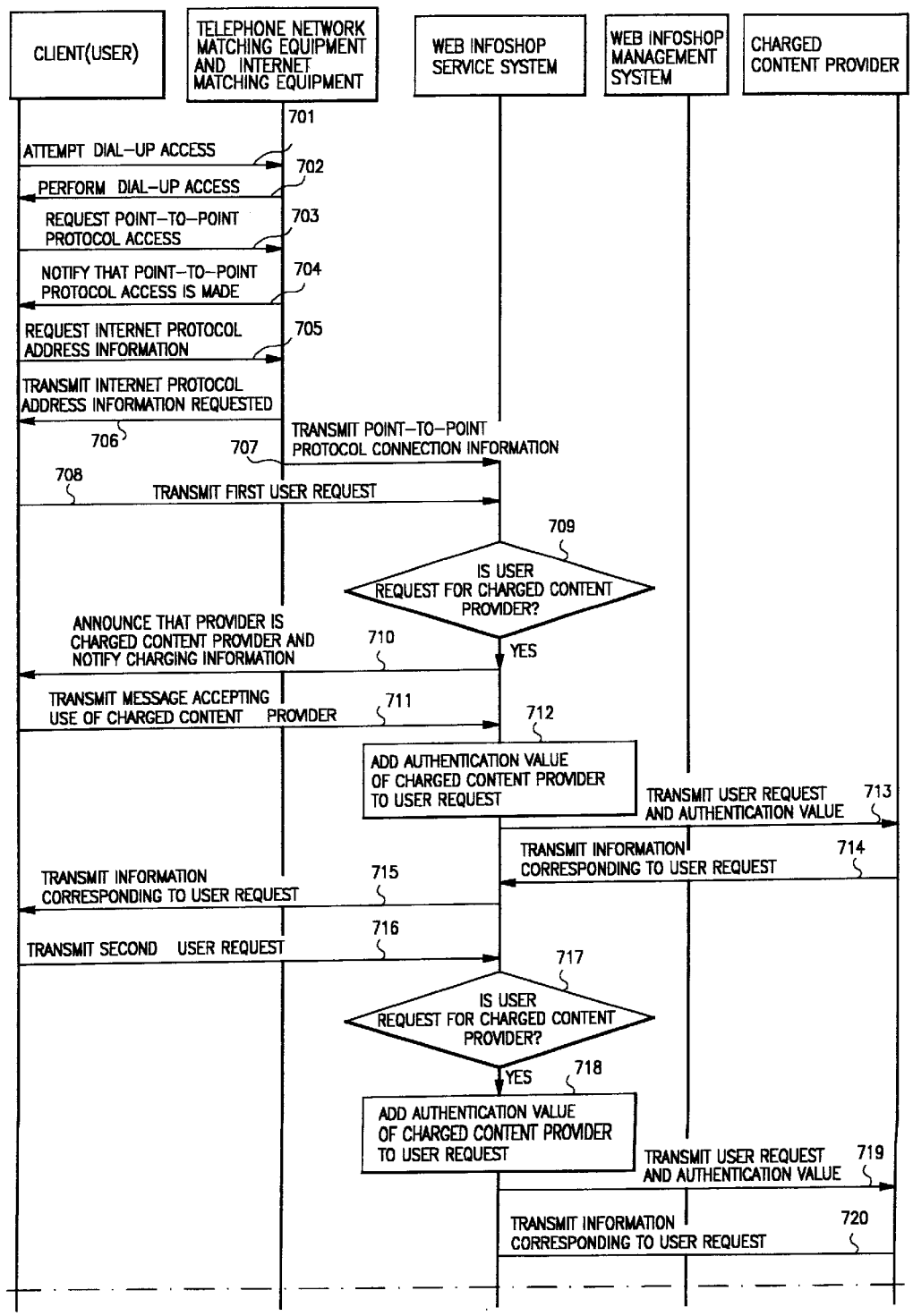
FIGS. 7a and 7b are flow charts showing the process depicted in FIG. 6 in detail.
Figure 7B:
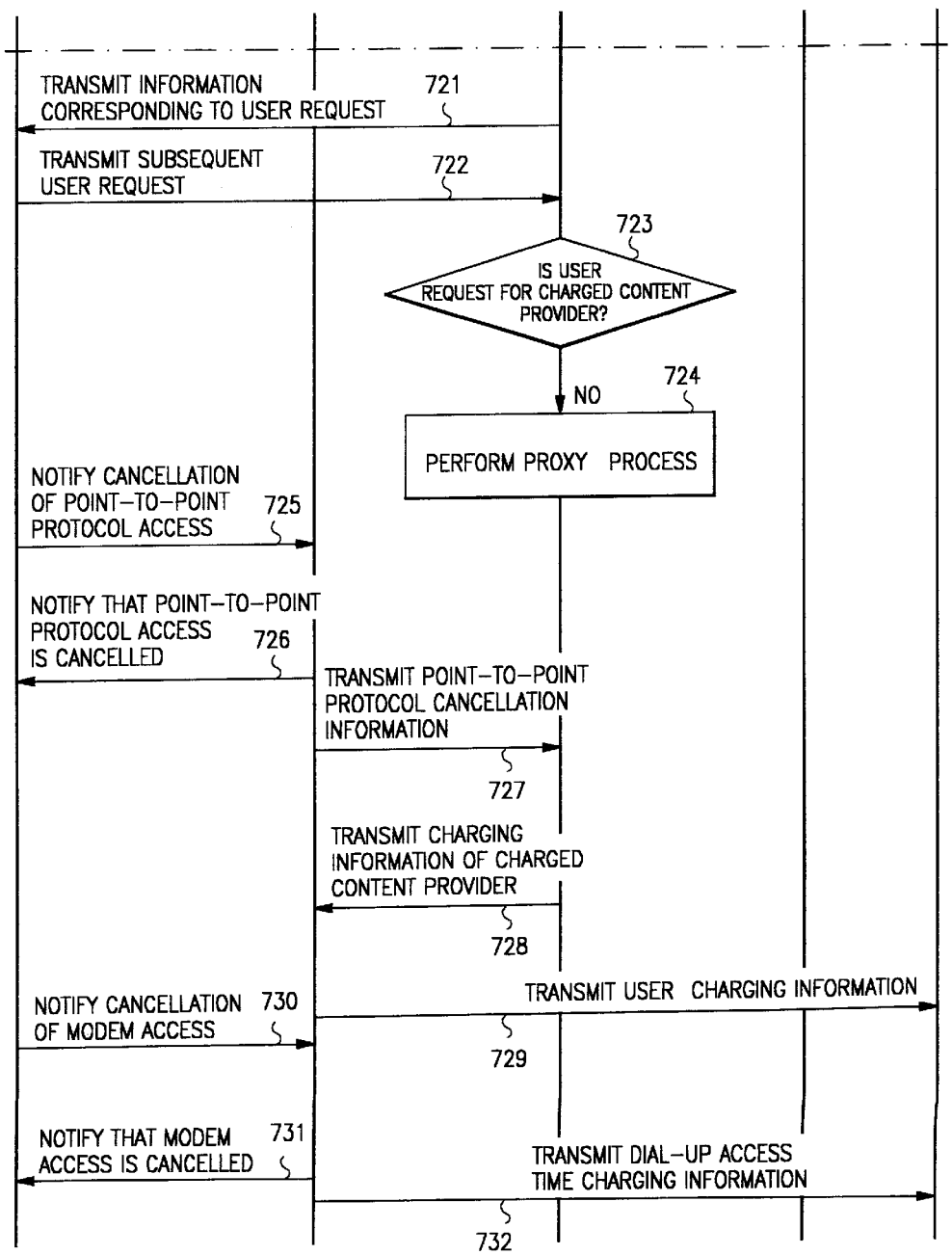

FIGS. 7a and 7b are flow charts showing the process depicted in FIG. 6 in detail.

When the client attempts dial-up access (701), the telephone network and internet matching equipment sends a dial-up access answer to the client (702). When the client requests the point-to-point protocol access of the telephone network and internet matching equipment (703), the telephone network and internet matching equipment sends a point-to-point protocol access answer (704).

When the client requests the internet protocol address information of the telephone network and internet matching equipment (705), the telephone network and internet matching equipment sends the internet protocol address information to the client (706), thus allowing the user to use the internet services. The telephone network and internet matching equipment sends information of the point-to-point protocol connection to the client to the web infoshop service system (707).

The information of the point-to-point protocol connection to the client is utilized for management of the session of the client. The web service using the hypertext transfer protocol is a connectionless mode service, where a primary or a last request from the client is not discriminated when there are different requests of the client because the connection is made whenever the client sends a request. To discriminate different requests from each other, the web infoshop service system retains the client's connection information.

After the point-to-point protocol connection information is received by the web infoshop service system, the client sends a first user request message to the web infoshop service system (708) and the web infoshop service system determines whether a destination is the charged content provider (709). If the destination is the charged content provider, the web infoshop service system stores information on the user request and notifies the user that the destination is the charged content provider with charging information of the provider (710).

When the client sends a message of requesting the use of the charged content provider to the web infoshop service system (711), the web infoshop service system requests an authentication value for the relevant charged content provider and adds the authentication value to the user request previously stored (712). The user request with the authentication value is sent to the charged content provider (713). When the charged content provider sends information corresponding to the user request to the web infoshop service system (714), the web infoshop service system sends this information to the client (715).

When the client sends the second user request message (716), the web infoshop service system determines whether the request is for a charged content provider (717). If the request is for the charged content provider, an authentication value for the charged content provider is added to the user request (718). The web infoshop service system sends the user request and the authentication value to the charged content provider (719), and then the charged content provider sends information corresponding to the user request to the web infoshop service system (720). The web infoshop service system receives and sends this information from the provider to the client (721).

When a subsequent user request message is sent from the client to the web infoshop service system (722), whether the user request is for a charged content provider is determined (723). If the request is not for the charged content provider, the web infoshop service system plays as a usual proxy (724). The proxy usually sends a request received from the client to a destination without change.

When the user terminates the use of the service, cancellation of the point-to-point protocol is requested (725). The telephone network and internet matching equipment notifies the user that the point-to-point protocol connection is cancelled (726). After cancelling the point-to-point protocol, the telephone network and internet matching equipment sends information of the cancellation of the point-to-point protocol to the web infoshop service system (727).

The web infoshop service system calculates the fee which is charged the user for using the services of the charged content provider through this point-to-point protocol connection and sends the charging information to the telephone network and internet matching equipment (728). The telephone network and internet matching equipment adds the fee to other fees and sends the charging information to a web infoshop management system (729). When the client sends a modem connection cancellation message to the telephone network and internet matching equipment (730), the telephone network and internet matching equipment notifies the client that the modem connection is cancelled (731) and sends the charging information based on the dial-up access time to the web infoshop management system (732).

Compared with the case of the first request, the process of notifying the information on the charged content provider and asking the user whether or not to use the provider is omitted in the case of the second request. Once the user selects to use the substitution authenticating and charging function of the web infoshop service for a particular charged content provider, the selection of the user is valid during one session of the point-to-point protocol connection.

The substitution authenticating and charging method according to one embodiment of the present invention uses the following charged content provider table where information on a charged content provider is written.

authentication type indicates a type of the authentication method employed by the charged content provider. The user name is a user name in case where the authentication is a basic type. The password is a password in case where the authentication is a basic type.

In case where the infoshop service system processes the web infoshop service using the such content provider table, once the program is started, the web infoshop service system receives the content provider table first and then processes a user request.

Figure 8:
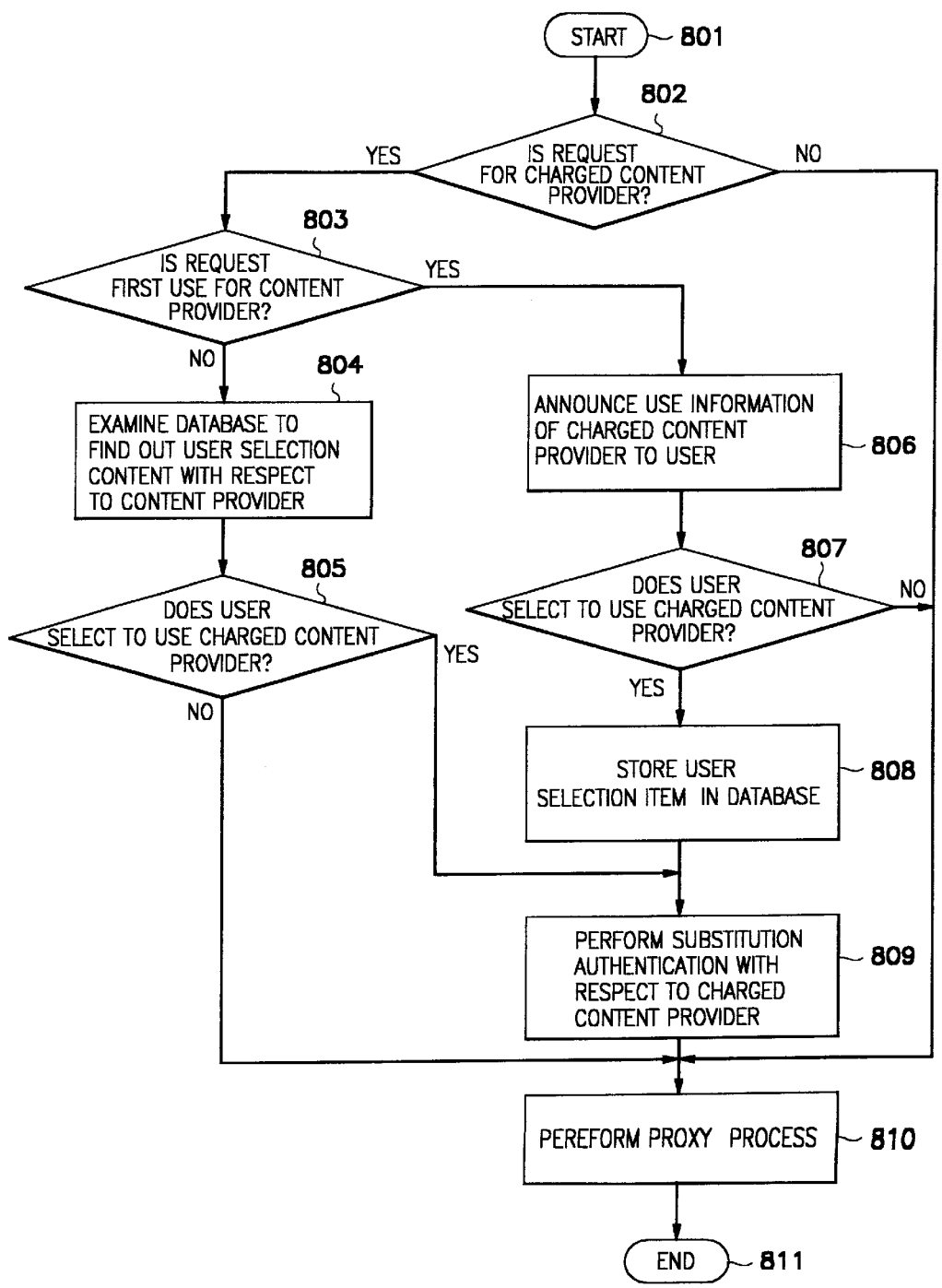
FIG. 8 is a flow chart showing the process depicted in FIG. 6 in detail much more.

As shown in FIG. 8, the web infoshop service system determines whether the request from a client is for a charged content provider (802). If the request is not for the charged content provider, the web infoshop service system performs a usual proxy process (810) and terminates the process of the user request (811).

If the request is for the charged content provider, whether the request is the first one of the client for the content provider is determined (803). If the request is not the first one, the database is checked to find out the content of the user selection for the charged content provider (804). Whether or not the user selects to use the content provider is determined (805). If the user selects the use of the content provider, the web infoshop service system authenticates the client for the content provider (809) and performs the proxy process (810) before terminating the process of the user request (811).

If the user refuses the use of the content provider, the web infoshop service system performs the proxy process (810) and terminates the process of the user request (811).

If the request from the client is determined to be the first one at the step 803, use information on the relevant charged content provider is notified to the user (806). The information on the charged content provider contains the kind of charging and the amount of charging. Whether or not the

TABLE 1

| local section | detailed local section | information kind | information type | serial number | directory number | host name | internet protocol number |
|---|---|---|---|---|---|---|---|
| port number | directory | charging type | charging unit | amount of charging | authentication type | user name | password |

The local section indicates a domestic region or the outside of the country. The detailed local section indicates a district in the domestic region or a nation in the outside of the country. The information kind presents a kind of the information, such as education, politics, or society. The information type indicates a type of the information, such as adults, adolescents, and free information. The serial number is a serial number given to a charged content provider. The directory number is a serial number of the charged directory contained in the content provider. The host name indicates the name of a host where a server of the charged content provider is located. The internet protocol number represents an internet protocol address of the server of the content provider. The port number indicates a number of a service providing port in the server of the content provider. The directory indicates a directory which is the least unit by which the web infoshop service is provided. The charging type represents a type of the charging such as specific amount charge or time charge. The charging unit indicates the unit by which the fee is charged, for example, a minute, a second, or a byte. The amount of charging indicates an amount of money charged by the unit of charging. The user accepts the use of the content provider is determined (807). If the user selects to use the provider, the web infoshop service system stores a user's selection item in the database (808), authenticates the client for the content provider (809), performs the proxy process (810), and finally ends the user request process (811).

If the user refuses the use of the content provider, the web infoshop service system performs the proxy process (810) and ends the user request process (811). The substitution authentication of the present invention means that the web infoshop service system authenticates the client for the content provider based upon the content provider table according to an authentication method demanded by the relevant content provider in place of the content provider. The web infoshop service system records a used time and volume of data used by the client with respect to the relevant content provider in the use recording file while performing the proxy process.

The present invention is based on web information processing technique, proxy server technique, and communication protocol conversion technique for communication between a user connected to the telephone network and a content provider connected to the internet.

Accordingly, by employing the substitution authentication method using a web infoshop service system, the present invention performs charging tasks, such as calculation of a fee charged to a user, issue of bills, and receipt of fees, in place of a charged content provider and allows the client to manage just one authentication value for the web infoshop service system, thereby removing the burden on the client caused by maintenance of many authentication values for different content providers and also considerably reducing the burden on the content provider in managing authentication values of many users.

It will be apparent to those skilled in the art that various modifications and variations can be made in a method of authenticating and charging a client using a web infoshop service system of the present invention without departing from the spirit or scope of the invention. Thus, it is intended that the present invention cover the modifications and variations of this invention provided they come within the scope of the appended claims and their equivalents.

What is claimed is:

1. A method of authenticating and charging a client using a web infoshop service system comprising the steps of:

transmitting protocol address information from the service system to the client when the client accesses the service system and selects a protocol access;

when a user request to the service system is for a charged content provider, adding an authentication value to the user request, transmitting the user request including the authentication value from the service system to the charged content provider, and transmitting information corresponding to the user request from the content provider to the client; and when the client cancels the protocol access and notifies cancellation information to the service system, transmitting charging information using the service system.

2. The method according to claim 1, wherein the step of transmitting the protocol address information comprises the steps of:

when the client performs dial-up access to a telephone network and internet matching equipment and requests point-to-point protocol connection and internet protocol address information, transmitting the internet protocol address information requested by the client from the telephone network and internet matching equipment to the client; and transmitting point-to-point protocol information from the telephone network and internet matching equipment to the service system.

3. The method according to claim 2, wherein the step of transmitting the internet protocol address information comprises the steps of:

determining whether the user request is a first use request for the charged content provider;

if the request is the first one, transmitting items of official announcement and charging information of the content provider to the client;

when the client selects to use the content provider, storing user selection items in a database, adding the authentication value to the user request, transmitting the user request including the authentication value, and transmitting the information corresponding to the user request from the content provider to the client;

if the user request is determined not to be the first one at the step of determining whether the user request is the first one, examining the database to find out content of the user selection with respect to the charged content provider;

after the step of examining the database, when the client selects to use the content provider, adding the authentication value to the user request, transmitting the user request including the authentication value, and transmitting the information corresponding to the user request from the content provider to the client; and after the step of examing the database, when the client does not select to use the content provider, performing proxy process.

4. The method according to claim 3, wherein the step of transmitting the charging information comprises the steps of:

if the client cancels the point-to-point protocol connection, transmitting the charging information of the charged content provider to a service management system internally located in the service system; and if the client cancels modem access, transmitting dial-up access time charging information from the telephone network and internet matching equipment to the service management system.

* * * * *